United States Patent [19]
Wahl et al.

[11] Patent Number: 5,845,755
[45] Date of Patent: *Dec. 8, 1998

[54] METHOD OF SPEED CONTROL OF A FRICTION CLUTCH IN A DRIVE TRAIN AND A DRIVE ENGINE AND DRIVE UNIT FOR EXECUTION OF THE METHOD

[75] Inventors: Georg Wahl; Friedrich Kurzay, both of Crailsheim; Thomas Rögner, Kirchberg; Dieter Pröger, Crailsheim, all of Germany

[73] Assignee: Voith Turbo GmbH, Heidenheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 635,612

[22] Filed: Apr. 22, 1996

[30] Foreign Application Priority Data

Apr. 21, 1996 [DE] Germany .................. 195 14 276.4

[51] Int. Cl.⁶ .............. F16D 25/04; F16D 25/0638; F16D 43/08
[52] U.S. Cl. ............... 192/85 F; 192/88 A; 192/103 F
[58] Field of Search ............. 192/103 F, 103 FA, 192/105 F, 85 F, 87.12, 88 A

[56] References Cited

U.S. PATENT DOCUMENTS

| | | | |
|---|---|---|---|
| 973,893 | 10/1910 | Tichomiroff et al. | 192/103 F X |
| 2,210,416 | 8/1940 | Kiep et al. | 192/85 F X |
| 2,620,685 | 12/1952 | Smirl | 192/87.12 X |
| 2,771,976 | 11/1956 | Smirl | 192/85 AA |
| 2,838,913 | 6/1958 | Peterson et al. | 192/87.12 X |
| 3,373,853 | 3/1968 | Aschauer | 192/85 |
| 3,872,956 | 3/1975 | Herr et al. | 192/103 FA X |
| 4,509,627 | 4/1985 | Kawamoto | 192/85 F |
| 4,583,626 | 4/1986 | Spridco | 192/85 F X |
| 4,586,594 | 5/1986 | Duminy | 192/103 FA |

FOREIGN PATENT DOCUMENTS

| | | |
|---|---|---|
| 0 098 054 | 1/1984 | European Pat. Off. . |
| 0 255 614 | 2/1988 | European Pat. Off. . |
| 0 282 741 | 9/1988 | European Pat. Off. . |
| 79 576 | 3/1963 | France . |
| 176 791 | 3/1906 | Germany . |
| 81 14 252.8 | 10/1982 | Germany . |
| 82 18 931.5 | 10/1982 | Germany . |
| 34 10 526 | 10/1985 | Germany . |
| 53-125549 | 1/1978 | Japan ..................... 192/85 F |
| 522519 | 11/1939 | United Kingdom . |
| 623003 | 5/1949 | United Kingdom . |
| WO 82/04107 | 11/1982 | WIPO . |

OTHER PUBLICATIONS

European Search Report for Application No. EP 96 10 4928, mailed Aug. 9, 1996.

English–language abstract of DE 34 10 526 (Item B5) from Derwent World Patent Index.

*Primary Examiner*—Rodney H. Bonck
*Attorney, Agent, or Firm*—Marshall, O'Toole, Gerstein, Murray & Borun

[57] ABSTRACT

A method and device for speed control of a friction clutch in a drive unit having a drive engine and in which the friction clutch includes at least two clutch parts that can be pressed together for purposes of torque transfer. The first clutch part is coupled at least indirectly to the drive engine and the second clutch part can be coupled to the drive engine via the first clutch part. The contact force for the clutch parts required for torque transfer is automatically applied hydraulically at least on achieving the idling speed of the drive engine by rotational pressure of a rotating ring of hydraulic fluid.

8 Claims, 6 Drawing Sheets

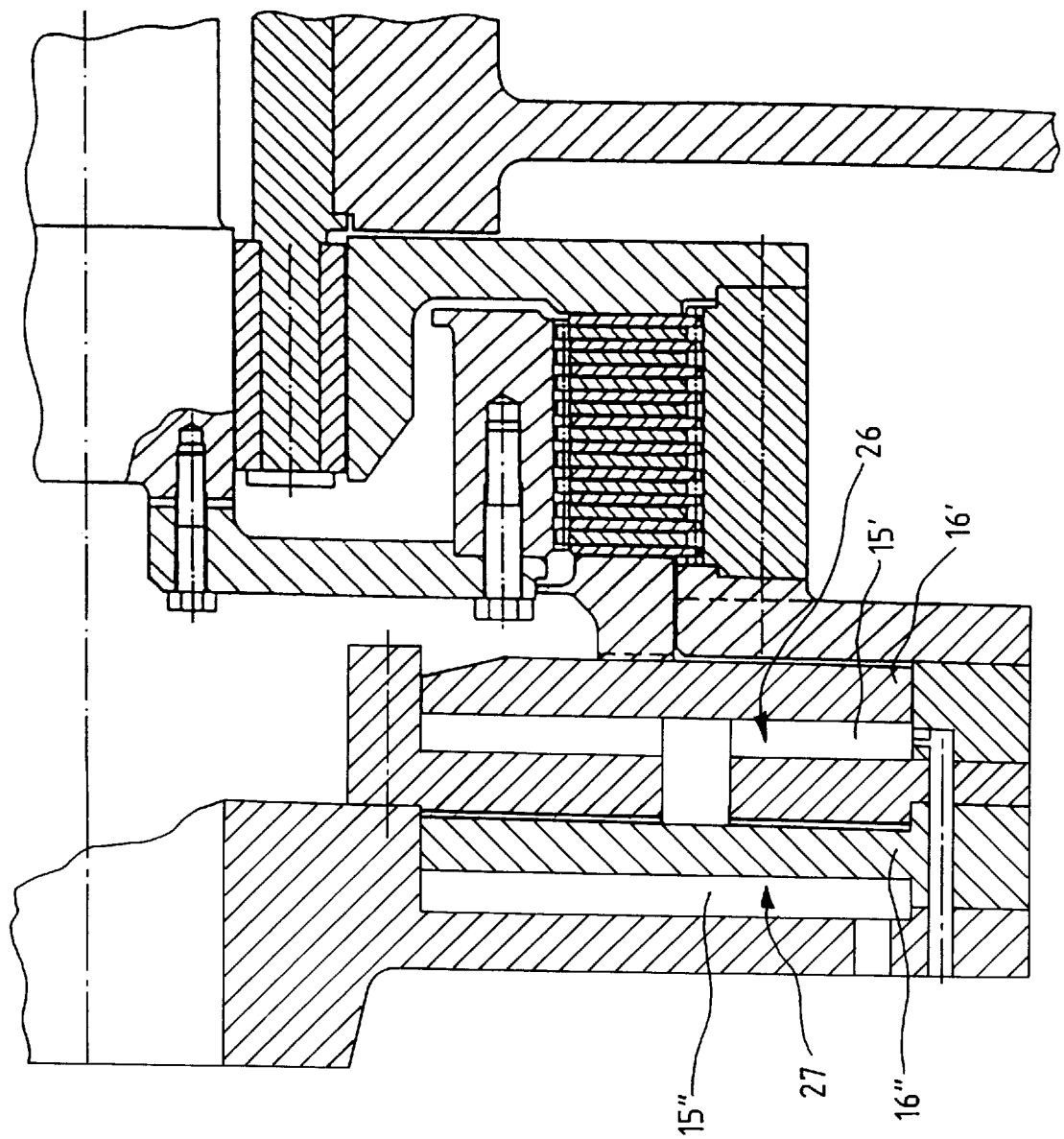

METHOD OF SPEED CONTROL OF A FRICTION CLUTCH IN A DRIVE TRAIN AND A DRIVE ENGINE AND DRIVE UNIT FOR EXECUTION OF THE METHOD

BACKGROUND OF THE INVENTION

1. Field of the Invention

The invention relates to methods for speed control of a friction clutch in a drive train comprising a drive engine and a drive unit for execution of such methods.

2. Description of Related Technology

It is known that speed control of friction clutches, especially multiple-disk clutches, occurs via variable force admission by means of separately produced hydraulic pressure via a piston. However, integration of such speed-controlled clutches in a drive train with a large overall control range is problematical. For example, control of propeller speed in ship propulsion units, i.e., the speed of the working machine from the full-load point to the engine idle speed, occurs with the drive engine, especially with a diesel engine, which has a control range of, say, about three-to-one (3:1), and then with a control clutch whose control range is about four to one (4:1). The total control range of the drive is then twelve-to-one (12:1).

The contact force of the disks required for torque transfer varies during driving of the propellers (rotary machines) with torque and thus as the square of the speed. This means that at maximum propeller speed the pressure required for contact of the disks must be one hundred percent (100%), whereas in the range of idling speed only a fraction, say, about ten percent (10%) of the maximum required pressure is necessary. At a usual control range of a Fottinger coupling with variable-pitch vanes of four-to-one (4:1), a necessary hydraulic pressure of less than one percent (1%) is obtained for the lowest propeller speed.

For the overall control range of the drive unit, the required contact force control of the disks is thus obtained by means of force admission with separately produced hydraulic pressure in a pressure range from almost 1% to 100%. The management of this enormous pressure range cannot be satisfactorily accomplished at economically acceptable cost.

SUMMARY OF THE INVENTION

It is an object of the invention to overcome one or more of the problems described above. It also is an object of the invention to modify a method for driving a drive unit with an engine and friction clutch so that the above-cited shortcomings are avoided.

A method for speed control of a friction clutch according to the invention utilizes a drive unit with a drive engine and a friction clutch that includes at least first and second clutch parts pressable together for the purpose of torque transfer. The first clutch part is coupled at least indirectly to the drive engine. The second clutch part can be coupled to the drive engine via the first clutch part. The steps of a method according to the invention include applying an automatic contact force for hydraulic torque transfer to the clutch parts at least on reaching the idling speed of the drive engine by rotational pressure of a rotating ring of hydraulic fluid and adjusting the contact force in a startup region of the drive unit by changing the degree of filling of the rotating ring of hydraulic fluid.

A drive unit for execution of a method for speed control of a friction clutch according to the invention includes a drive engine and a friction clutch having at least first and second clutch parts, the first clutch part at least indirectly coupled to the drive engine and the second clutch part capable of being coupled to the drive engine via the first clutch part. The drive unit further includes at least one device connected to the friction clutch for applying contact force to the friction clutch to force together the first and second clutch parts. This device has at least one pressure chamber that can be acted upon by hydraulic fluid and an activation mechanism connected to the pressure chamber that can be activated with the pressure of the hydraulic fluid, which is active at least indirectly on the clutch parts. The drive unit further includes apparatus for achieving a change in filling of the chamber connected to the device for applying contact force to force together the first and second clutch parts. The apparatus includes a mounting for rotating the pressure chamber so that during operation of the drive unit, the pressure chamber rotates with a speed at least proportional to the speed of the drive engine.

Other objects and advantages of the invention will be apparent to those skilled in the art from the following detailed description taken in conjunction with the drawings and the appended claims.

BRIEF DESCRIPTION OF THE DRAWING

FIG. 6 is a cross-sectional view of a fourth embodiment of a device according to the invention.

DETAILED DESCRIPTION OF THE INVENTION

Figure 1:
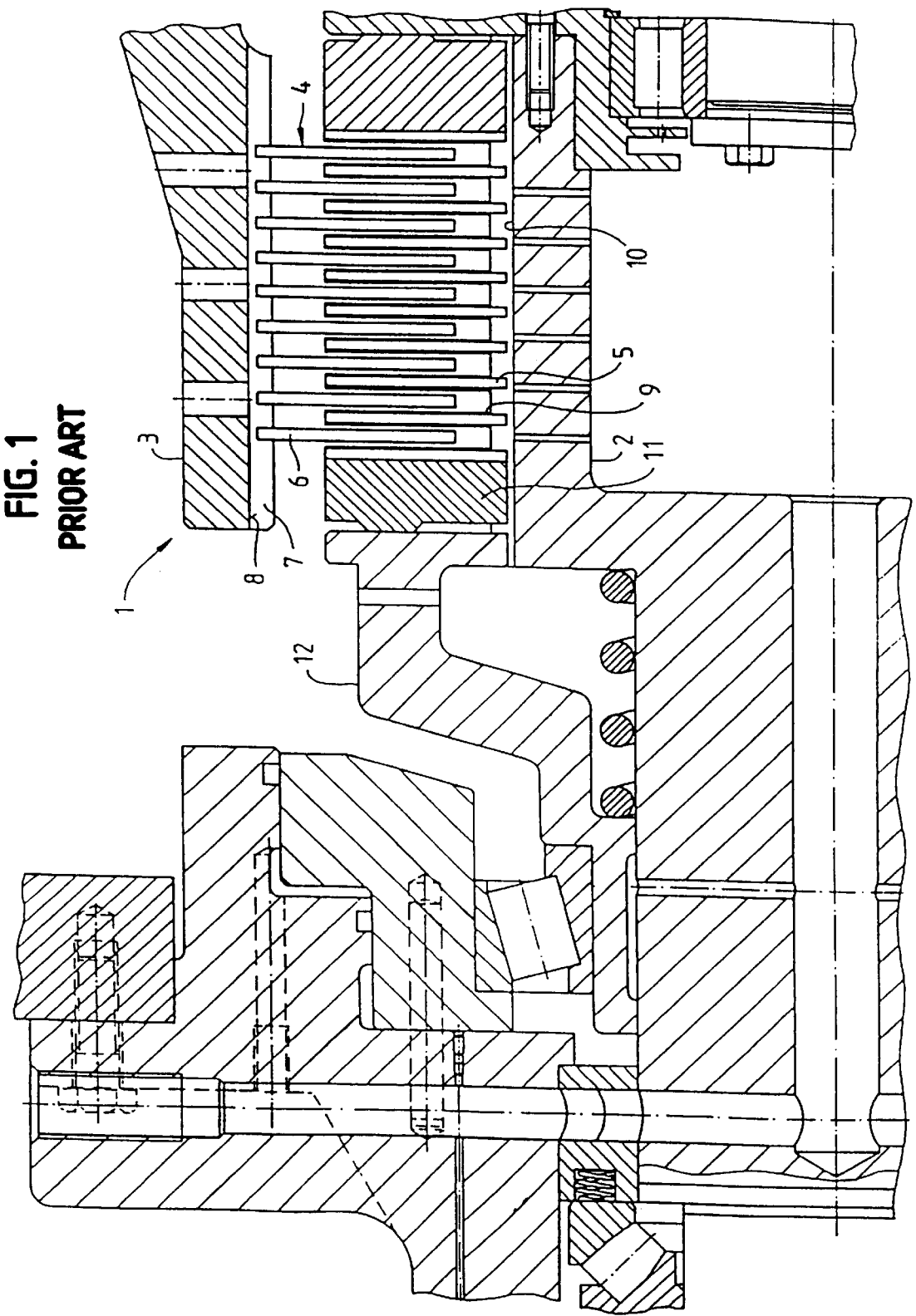
FIG. 1 is a cross-sectional view of a multiple disk clutch assembly according to the prior art.

According to the invention, the rotational pressure of a rotating liquid ring, for example, an oil ring acting on a rotating piston, is used to create the contact force on the disks of the friction clutch at least for the range from achievement of idling speed to maximum speed of the drive engine. In addition to the speed, the size of the oil ring, i.e., the design and filling of the rotating cylinder-piston unit is crucial for the size of the contact force created by means of rotational pressure. The invention is based on the fundamental idea that, during use of the principle of rotational pressure, adjustment of the contact force on the disks required in each case for torque transfer is automatically adjusted with the speed of the drive engine. The active control range to be covered by the friction clutch, i.e., by the control device, is thus reduced to a fraction of the active control range present in conventional designs. Control range is to be understood to mean the range in which the pressure required to apply the contact force must be varied by an outside influence. Active pressure control or contact force control in a method and device according to the invention is therefore only necessary in the range of speed adjustment of the Fottinger coupling. This can occur by a change in filling of the rotating oil ring according to the principle of throttling of a control oil stream or by means of a suction tube.

According to an aspect of the invention, at least one device to apply the contact force required to press together the two parts of the coupling is connected according to this arrangement to the friction clutch. The device comprises at least one pressure chamber that can be acted upon by a hydraulic fluid and an activation device coupled to the pressure chamber that can be acted upon by the pressure of the hydraulic fluid, which becomes active at least indirectly relative to the coupling parts, as well as means to accomplish a change in filling. The pressure chamber is mounted to rotate so that it rotates during operation of the drive unit with a speed at least proportional to the speed of the drive shaft.

The pressure chamber can be formed, for example, by a cylinder/piston unit having at least an admission and discharge channel connected thereto.

The piston acts as an activation device relative to the two coupling parts which can occur directly or indirectly, for example, via a pressure ring used to press against the disks of the friction clutch, which is shifted in the axial direction relative to the disks because of the contact force applied by the piston and in so doing presses them against each other. Another possibility consists of using a cylindrical component disposed coaxially relative to the friction clutch as a device to apply the contact force, which has an at least partially elastic wall, for example, in the form of a membrane which acts as an activation device for pressing the disks of the friction clutch together.

The pressure created in the pressure chamber filled with the liquid by rotation acts on the activation device and is converted to a force that again acts on the disks.

Moreover, there is a possibility of using consecutive switching of the devices, for example, in the form of a multiple-piston version. The pistons are then connected in nonpositive fashion in series so that each piston is acted upon by a separate rotating oil ring. Each of these oil rings can be controlled by itself. As a result, greater required filling changes occur and the filling adjustment becomes more insensitive.

Because of the methods and devices according to the invention, it is merely necessary to achieve the contact force in a friction clutch during the startup process or during crawling motion in a drive train with a drive motor by a filling change of the oil ring or hydraulic fluid ring. After achievement of idling speed of the drive engine, for example, a diesel engine, a stable rotating oil ring is formed in the pressure space, which applies a pressure to the pressure disk via a piston that increases as the square of the speed of the drive engine. In this fashion, continuous speed control to the maximum speed of the drive is achieved. The control engineering and design costs can thus be reduced to a minimum.

Figure 2:
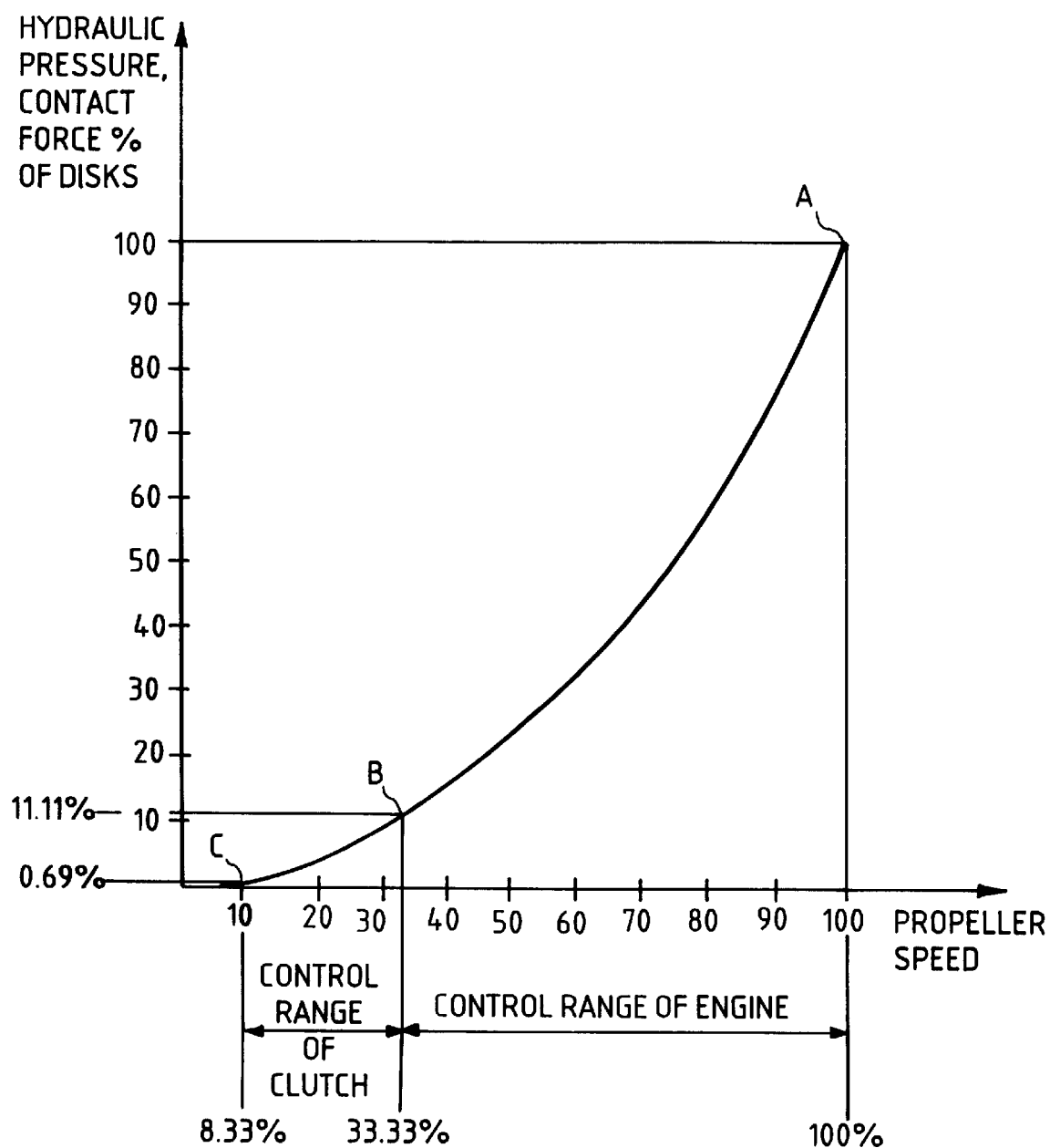
FIG. 2 is a graph depicting hydraulic pressure, contact force percentage of brake disks vs. propeller speed for the device shown in FIG. 1.
Figure 3:
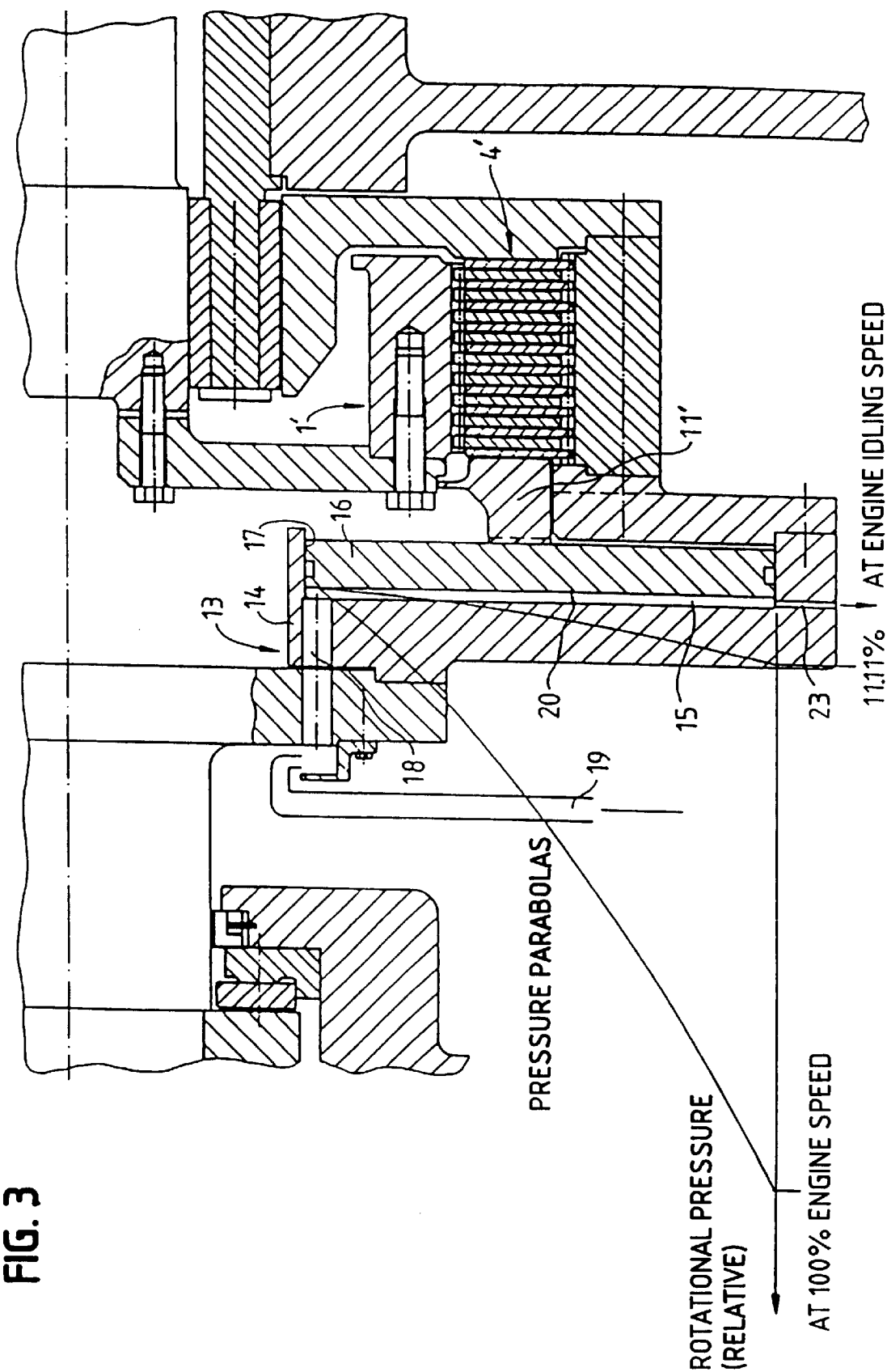
FIG. 3 is a cross-sectional view of a device according to the invention and includes pressure parabolas.
Figure 4:
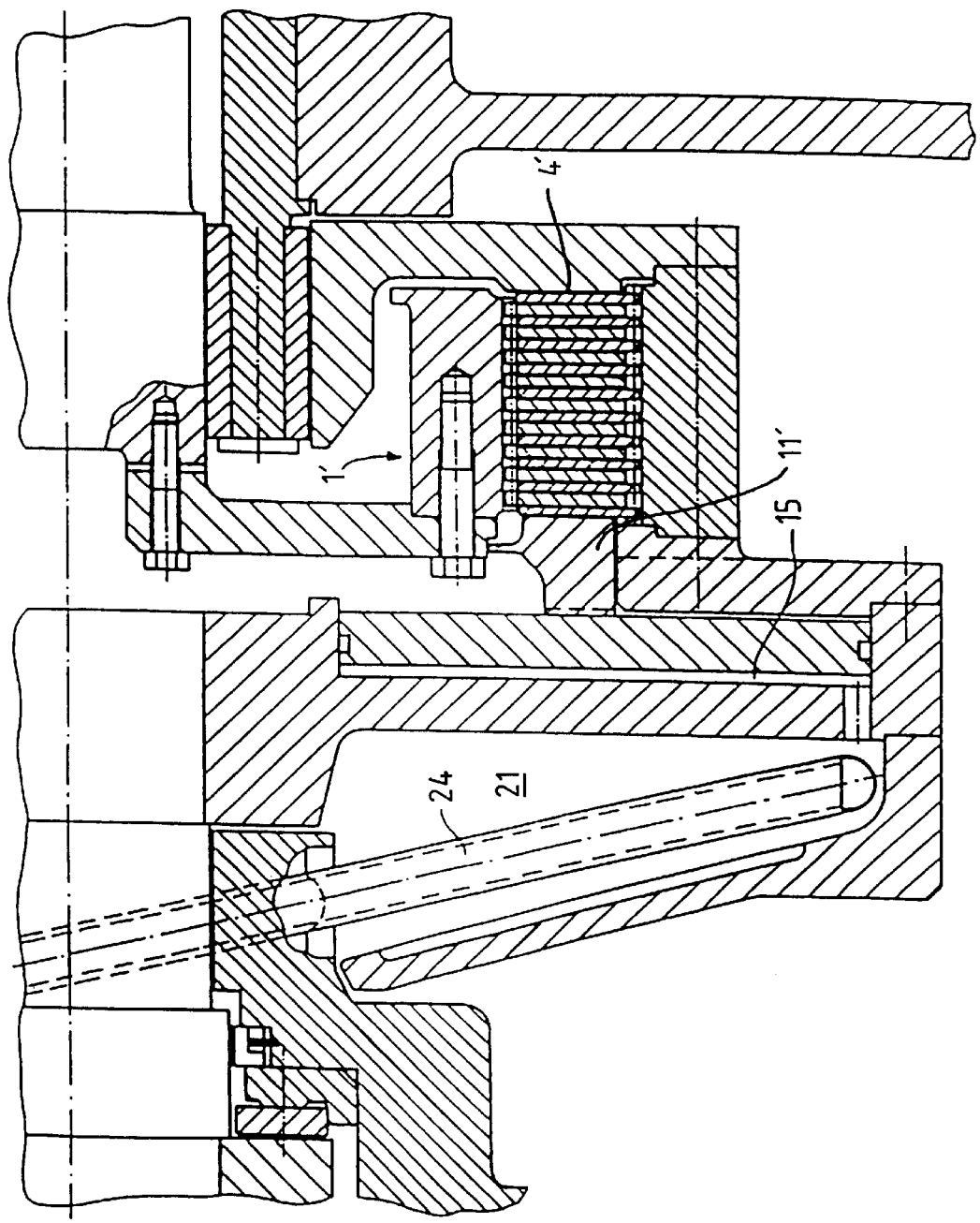
FIG. 4 is a cross-sectional view of a second embodiment of a device according to the invention.

Preferred areas of application for a method according to the invention are drive units with a large overall control range. These include, for example, ship propulsion units. Control of the propeller speed ordinarily occurs in this case, in which the propeller of the working machine being driven corresponds from the full-load point to the engine idling speed to a diesel engine and from there onto a control clutch. Methods and devices according to the invention are explained below with reference to the figures:

FIG. 1 shows a conventional solution for speed control of friction clutches; FIG. 2 shows the change in contact force required for torque transfer of the disks shown in FIG. 1 during driving of propellers; FIG. 3 shows an embodiment according to the invention for a multiple disk clutch for driving rotating machines; and FIG. 4 shows the possibility of a filling change of a rotating oil ring of the invention by means of a suction tube.

FIG. 1 shows a conventional device and method for speed control of friction clutches by means of variable force application by separately produced hydraulic pressure via a piston. The friction clutch is shown here in the form of a multiple-disk clutch 1 having an inner clutch body 2, an outer clutch body 3, and a stack of disks 4. The individual disks of the stack of disks 4, divisible into inner disks 5 and outer disks 6, engage in shape-mated fashion with a groove 7 on an inside diameter 8 of the outer clutch body 3 or with grooves 9 on an outside diameter 10 of the inner clutch body 2. The pressure on the individual disks required for force transfer is accomplished by means of a pressure disk 11 which is pushed against the stack of disks 4 and in so doing presses together the individual disks. The force required for displacement is transferred by means of a pressure ring in which the pressure transferrable with the piston is produced hydraulically. This pressure is externally controlled.

A problem of this conventionally known apparatus and method lies in the overall control range of the drive. The overall control range is obtained from the control range of the drive engine, which can be designed as a diesel engine, for example, assumed to be about three-to-one (3:1) and the control range of the control clutch of, say for example, four-to-one (4:1).

FIG. 2 shows via a diagram an example of the change in hydraulic pressure required in a conventional device and method (as shown in FIG. 1) and thus the change in contact force on the disks. The indicated figures serve for explanation. The contact force required for torque transfer of the disks varies during driving of rotary machines, especially propellers, in proportion to torque and thus quadratically with speed. A pressure of one-hundred percent (100%) is required at point A, the point of maximum propeller speed, during an adjustment occurring according to the conventional technique of the contact force of the disks required for torque transfer, by controlling an external control pressure. At point B, i.e., here the engine idling speed, only a small fraction of the pressure of point A is still required. For the lowest propeller speed, which corresponds to point C, a required hydraulic pressure on the contact piston of the stack of disks of less than one is required. This means that in conventional methods and apparatus, the pressure range must be managed from almost zero (0) to one-hundred (100%).

In contrast, FIG. 3 shows an embodiment according to the invention in which only the pressure range of from zero (0) to about twelve percent (12%) still needs to be managed with respect to the example shown in the diagram of FIG. 2.

FIG. 3 shows an embodiment according to the invention in which the principle of rotational pressure according to the invention is applied. A multiple disk clutch 1' corresponds in basic design essentially to that described with respect to the multiple disk clutch 1 of FIG. 1, for which reason the reference numbers 1', 4' and 11' are used for the same elements in FIG. 3 which correspond to reference numerals 1, 4 and 11, respectively in FIG. 1. The position change of the pressure disk 11' and thus pressing together of the disks of the stack of disks 4' occurs by means of a device 13. This device functions in principle like a cylinder-piston unit. The device 13 comprises a cylinder element 14, which has a variable pressure space 15 in a filling (i.e., gap or space which may be filled, for example, with a fluid) thereof and a disk 16 acting as piston. The disk is then guided in a liquid-impermeable manner on an inside surface 17 of the cylinder element 14. The device 13 has an inlet 18 coupled, for example, to a hydraulic fluid supply device 19.

The working or pressure space 15 is filled with an operating fluid, for example, an oil. A rotating oil ring is formed because of the rotation of the device. This means that active pressure control, i.e., control of the contact force of the disks only is necessary in the range of speed adjustment of the clutch 1'. In the engine control range, i.e., in the range of high speeds, the contact force results from the oil ring rotating as a function of the engine speed. A pressure adjustment in the pressure space for this range in order to permit displacement of the disk 16 is not required at a specified filling.

A filling change of the rotating oil ring is required for a speed change and thus a change in contact force on the disks of the stack of disks 4. This can occur according to two principles:

(1) Throttling of a control oil stream; and (2) Filling adjustment by means of a suction tube.

The device 13 also has an operating fluid discharge 23. There is a possibility of continuously filling the working or pressure space 15 with a specified amount of oil, in which this is not changed over longer operating periods.

Up to the engine idling speed (the idling speed in this example corresponds to a required contact force of 11.11% relative to the required contact force at full engine speed) the speed adjustment on the clutch occurs by a change in filling of the rotating oil ring. On achievement of the engine idling speed the oil ring is left to its own devices and the pressure is increased quadratically with increasing speed on an inside surface 20 of the disk 16, during which the disk 16 is displaced in the direction of the pressure disk 11' and thus presses this against the stack of disks 4'. On achievement of the engine idling speed no filling change is required any longer.

FIG. 4 shows and embodiment of the invention similar to that shown in FIG. 3, but in which the filling change of the rotating oil ring occurs by means of a suction tube 24. The suction tube 24 extends into a chamber 21 disposed in front of the working or pressure chamber 15. The amount of liquid in the pressure or working space is then determined by the radial position of the suction tube arranged in the front space. Activation of the suction tube can occur manually or by an actuating drive that can also be incorporated in the control system.

Figure 5:
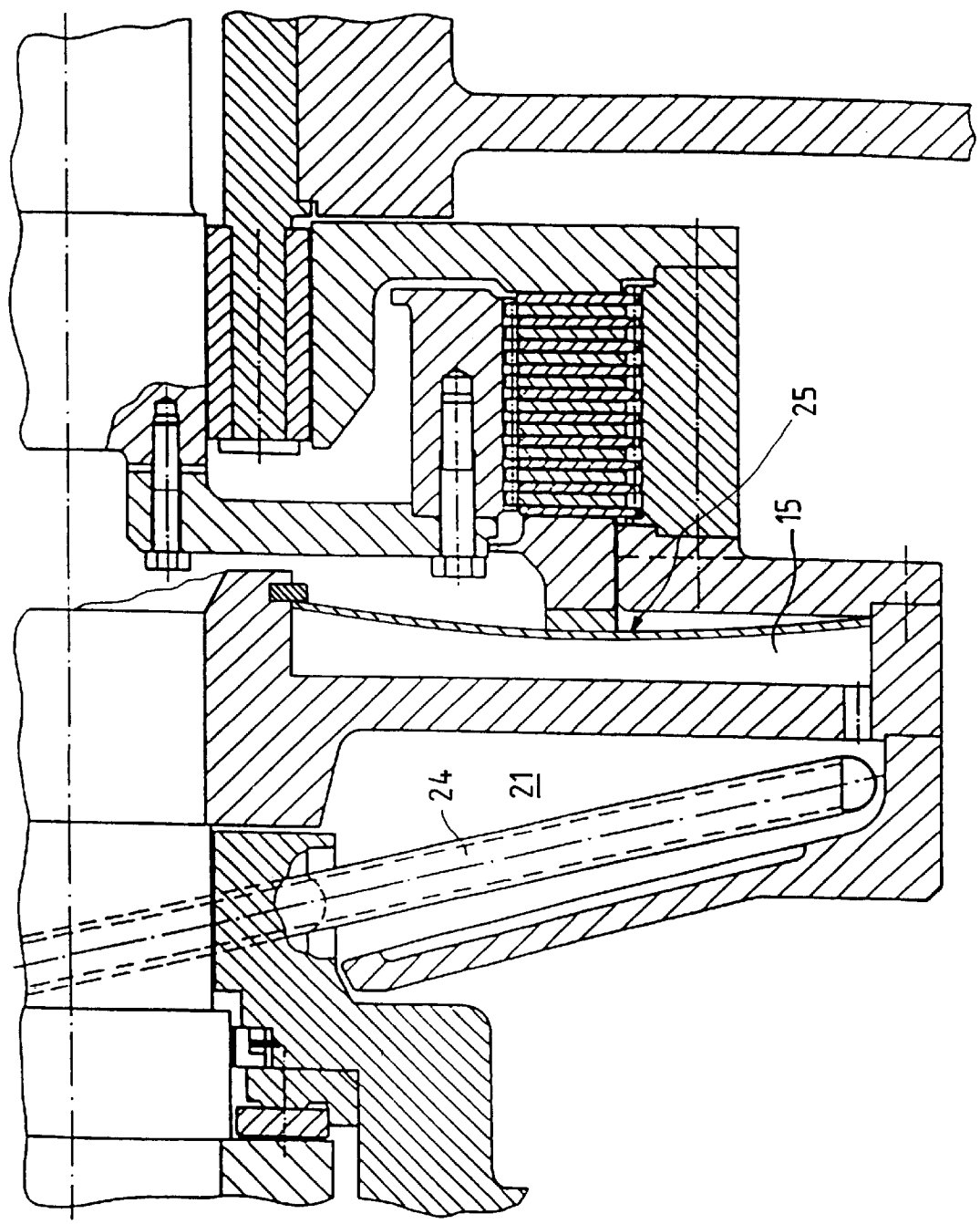
FIG. 5 is a cross-sectional view of a third embodiment of a device according to the invention.

FIG. 5 shows an embodiment of the invention similar to that shown in FIG. 4, wherein the pressure chamber is formed from a rotatable cylindrical component with a wall designed as an elastic membrane 25 that can be active against the clutch parts.

FIG. 6 shows an embodiment of the invention similar to what is shown in both FIGS. 3 and 4, but utilizing two devices 26 and 27 connected in series for applying contact force to the friction clutch. The device 26 includes a working or pressure space 15' and a disk 16' acting as a piston. The device 27 includes a working or pressure space 15' and a disk 16" acting as a piston.

The foregoing detailed description is given for clearness of understanding only, and no unnecessary limitations should be understood therefrom, as modifications within the scope of the invention will be apparent to those skilled in the art.

What is claimed is:

1. A method for speed control of a drive unit with a large overall control range, said drive unit comprising a drive engine and a friction clutch, the friction clutch including at least first and second clutch parts pressable together for the purpose of torque transfer, the first clutch part being coupled at least indirectly to the drive engine and the second clutch part capable of being coupled to the drive engine via the first clutch part, the method comprising the steps of:

applying an automatic contact force for hydraulic torque transfer to the clutch parts at least on reaching an idling speed of the drive engine by rotational pressure of a rotating ring of hydraulic fluid; and adjusting contact force during startup and crawling motion by changing the degree of filling of the rotating ring of hydraulic fluid of the drive unit.

2. The method of claim 1 further comprising the step of providing at least one cylinder/piston unit, a contact force between the individual clutch parts required for torque transfer being achieved by action on the piston of the cylinder/piston unit with hydraulically produced pressure, the cylinder/piston unit being designed and disposed so that the contact force for the clutch parts required for torque transfer is automatically applied at least on reaching the idling speed of the drive engine by the rotational pressure of the rotating ring of hydraulic fluid, the stating ring being disposed in a space of the cylinder/piston unit formed by the cylinder and piston, said space being foldable with hydraulic fluid.

3. A drive unit with a large overall control range, the drive unit comprising:

a drive engine;

a friction clutch further comprising at least first and second clutch parts, the first clutch part at least indirectly coupled to the drive engine and the second clutch part capable of being coupled to the drive engine via the first clutch part;

at least one device connected to the friction clutch for applying contact force to the friction clutch to force together the first and second clutch parts at least on reaching an idling speed of the drive engine, the device comprising at least one pressure chamber that can be acted upon by hydraulic fluid, the device further comprising an activation mechanism connected to the pressure chamber that can be activated with the pressure of the hydraulic fluid, which is active at least indirectly on the clutch parts;

means for achieving a change in an amount of filling in the chamber during a start-up operation and crawling motion, the means connected to the device for applying contact force to force together the first and second clutch parts, the means further comprising a mounting for rotating the pressure chamber so that during operation of the drive unit, the pressure chamber rotates with a speed at least proportional to a speed of the drive engine.

4. The drive unit of claim 3 wherein the pressure chamber is formed by a cylinder/piston unit mounted to rotate and disposed coaxially to the friction clutch, the piston being shiftable against the clutch parts.

5. The drive unit of claim 3 wherein the means for achieving a change in filling of the chamber is a suction tube.

6. The drive unit of claim 3 wherein the friction clutch is a multiple disk-clutch.

7. The drive unit of claim 3 wherein the pressure chamber is formed from a rotatable cylindrical component with a wall designed at least partially as an elastic membrane that can be active against the clutch parts and the cylindrical component being disposed coaxially to the friction clutch.

8. The drive unit of claim 3 wherein a plurality of devices are connected in series.

* * * * *